United States Patent
Bullwinkle

[11] Patent Number: 5,901,512
[45] Date of Patent: *May 11, 1999

[54] HARDWIRING RACE FOR OFFICE PARTITIONS

[75] Inventor: Wallace C. Bullwinkle, Norristown, Pa.

[73] Assignee: Knoll, Inc., East Greenville, Pa.

[*] Notice: This patent issued on a continued prosecution application filed under 37 CFR 1.53(d), and is subject to the twenty year patent term provisions of 35 U.S.C. 154(a)(2).

[21] Appl. No.: 08/628,847

[22] Filed: Apr. 8, 1996

[51] Int. Cl.$^6$ .................................. F04B 2/78; H02G 3/28
[52] U.S. Cl. .............................. 52/220.7; 52/239; 174/48
[58] Field of Search ...................... 52/220.7, 239; 439/215, 216, 207, 209, 212; 174/95, 97, 48, 49

[56] References Cited

U.S. PATENT DOCUMENTS

| | | |
|---|---|---|
| 4,135,775 | 1/1979 | Driscoll . |
| 4,277,123 | 7/1981 | Haworth et al. .................. 439/215 |
| 4,470,232 | 9/1984 | Condevaux et al. .............. 52/220.7 |
| 4,685,255 | 8/1987 | Kelley . |
| 5,065,556 | 11/1991 | DeLong et al. .................. 52/220.7 |
| 5,209,035 | 5/1993 | Hodges et al. . |
| 5,214,889 | 6/1993 | Nienhuis et al. . |
| 5,244,401 | 9/1993 | Russell et al. .................. 439/215 |
| 5,336,849 | 8/1994 | Whitney ...................... 439/215 X |
| 5,349,135 | 9/1994 | Mollenkopf et al. . |
| 5,357,055 | 10/1994 | Sireci . |
| 5,381,994 | 1/1995 | Welch ......................... 52/220.7 X |
| 5,511,348 | 4/1996 | Cornell et al. ................. 52/220.7 X |
| 5,685,113 | 11/1997 | Reuter et al. .................. 52/220.7 |

Primary Examiner—Christopher Kent
Assistant Examiner—Timothy B. Kang
Attorney, Agent, or Firm—Buchanan Ingersoll, P.C.

[57] ABSTRACT

An office partition panel is electrically attached to an adjacent panel and/or a power source line. The panel has a body to be mounted upright on a lower edge having an elongated weldment forming a channel opening upwardly. Frame elements engage between the body and the weldment, spacing the channel from the body and from a lowermost channel forming the lower edge of the panel. The weldment provides lateral access to the channel for laying in wiring. An electrical fixture such as an outlet receptacle is mounted along the channel, and the channel supports the electrical wiring terminating at the electrical fixture. The wiring path leads from the channel in one panel to an adjacent panel and a bridge channel element attaches to the weldment to extend the channel across a gap between the adjacent panels. A cover strip removably mountable on the lower edge covers the channel laterally for enclosing the electrical wiring, and a bridge cover strip covers the bridge channel element across the gap. The electrical wiring can be installed laterally into the channel, and terminated at the electrical fixture, for hardwiring the partition system, whereupon the channel is closed to safely enclose the wiring.

12 Claims, 3 Drawing Sheets

HARDWIRING RACE FOR OFFICE PARTITIONS

BACKGROUND OF THE INVENTION

1. Field of the Invention

The invention relates to the field of electrical connections made in temporarily installed structures such as wiring for electrical power installed between office partition panels. In particular the invention concerns a wiring raceway for adapting vertical wall panels to be hardwired between electrical power outlets, rather than being connected by modular pre-wired conduit, plug connectors or the like.

2. Prior Art

Office partitions are very useful for subdividing an open floor space into work areas. The partitions provide privacy without the expense and permanence of structural walls, and are inexpensive and versatile as to the choice of particular configuration of panels used to enclose a particular work area. Typically the partitions comprise flat modular panels about 2–5 feet wide (0.6–1.5 m) and 3.5–5.5 feet high (1.1–1.7 m). Adjacent coplanar panels are attached edgewise, and panels also can be joined at right angle L or tee joints, forming a square or rectangular area of the desired floor area, for containing a desk or other worksurface.

Work areas usually require electrical service for operating equipment such as computers, calculators, lamps and so forth. Electrical power outlets or receptacles can be provided in the partition panels, for example along the lower edge of the panels, at an elevation slightly above a desktop, along vertical lines, etc. Any number of panels can be attached at any desired configuration of straight lengths, right angle or other angular bends, joints and the like, a typically varied arrangement being shown, for example, in U.S. Pat. No. 4,685,255—Kelley. Some provision must be made to attend to electrical connections between a source of electrical power and the electrical outlet receptacles (as well as other services such as installed lighting and the like).

Apart from electric power conductors, data transmission cables for computer networks and the like, telephone cables and other signalling wiring may be advantageously installed in and between partition panels. Whereas currents in power cables can induce currents in signalling wiring, it is advantageous either to shield between power and signalling wiring or to keep them well spaced from one another.

Electrical receptacles or mountings for electrical receptacles can by provided in an edge structure of the panels such as along a lower edge where the electrical receptacles as well as adjustable levelling legs are disposed. Typically, the electrical receptacles are mounted in enclosures such as standard receptacle boxes, connected to conduit through which wires must be fished. Alternatively flexible armored cable (e.g., BX cable) is used, with the armor being mechanically attached to the box and forming a sort of conduit. The electrical circuits are thus enclosed for safety.

According to one arrangement, the partition panel has two structural legs at the opposite lower corners, attached to an upwardly opening channel such that the channel is spaced from the panel. The channel defines the lowermost edge of the partition panel. Threaded leveling legs attach to the structural legs and/or to the lowermost edge channel. The area between the lowermost edge channel and the panel is used for routing conduits or modular wiring, and is covered by snap-on cover strips on both sides, for cosmetic purposes. Examples are disclosed in U.S. Pat. No. 5,381,994—Welch; U.S. Pat. No. 5,357,055—Sireci; U.S. Pat. No. 5,349,135—Mollenkopf et al.; U.S. Pat. No. 5,214,889—Nienhuis et al.; U.S. Pat. No. 5,209,035—Hodges et al.; and U.S. Pat. No. 4,135,755—Driscoll.

To employ pre-mounted receptacles or standard mounts for receptacles, electrical conductors are needed between the receptacles, which are wired in parallel, and to a circuit breaker panel. One known arrangement uses modular flexible cables of a length sufficient to reach from an electrical outlet in one panel to the electrical outlet in the next panel, or alternatively from an electrical outlet to the edge of the associated panel. End plugs terminate the cables and mate with the electrical outlets or with one another. The flexible cables can simply be stretched from one junction to the next, occupying the area at the bottom of the partition panel that is covered by the cover strip. Alternatively, flexible conduit can be run from connection to connection, around angles and the like, the conduit being mechanically attached at its ends to some point adjacent to the electrical connections.

According to some electrical building codes, for example in Chicago, modular connector cable arrangements for such partition panels are prohibited. All electrical outlets must be hardwired by licensed electricians. Also, where conduits are required or used, fitting and mechanically mounting the conduits is inconvenient and time consuming, and after placing the conduits the conductor wires must be fished endwise through each conduit length. What is needed is a modular panel arrangement that is better suited for hardwiring, and has features leading to convenience and speed of installation in a system of modular partition panels. What is also needed is a way in which the conventional partition panel arrangement of a panel on legs with a lowermost edge channel, can be modified optimally to suit the needs of hardwired partition systems.

SUMMARY OF THE INVENTION

It is an object of the invention to facilitate hardwiring of office partition panel arrangements.

It is also an object to provide a cable raceway channel as an integral part of a partition panel, for supporting power conductors extending between connections in successive panels, for example at electrical power outlet receptacles.

It is a further object to provide a bi-level cable raceway channel as described, the levels respectively carrying power and signalling conductors.

It is another object to employ a transverse barrier element in association with terminations of power conductors in a cable raceway, either to terminate conduits holding the conductors, or to provide a physical support for the conductors adjacent to their terminations.

It is a further object to provide a channel arrangement in which the conductors can be simply laid in laterally without fishing, wherein the overall unit defines an enclosure for the path of the conductors in each partition panel, and to provide a bridge element for extending the enclosure between adjacent partition panels.

These and other objects are accomplished by an office partition panel electrically attached to an adjacent panel and/or a power source line. The panel has a body to be mounted upright on a lower edge having an elongated weldment forming a channel opening upwardly. Frame elements are coupled to the weldment and engage between the body and the weldment, preferably at length adjustable feet. The frame elements space the channel from the lower edge of the panel and provide lateral access to the channel for laying in wiring. An electrical fixture such as an outlet receptacle is mounted along the channel, and the channel supports electrical wiring terminating at the electrical fixture. The channel leads from one panel to an adjacent panel and a bridge channel element attaches to the weldment to extend the channel across a gap between the adjacent panels. A cover strip removably mountable on the lower edge covers the channel laterally for enclosing the electrical wiring, and a bridge cover strip covers the bridge channel element across the gap. The electrical wiring can be installed laterally into the channel, and terminated at the electrical fixture, for hardwiring the electrical fixture panels, whereupon the channel is closed to safely enclose the wiring.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

The invention provides a partition panel system 20 that is particularly adapted for installations that are hardwired, i.e., having cables spanning indeterminate lengths and cable terminations made directly between conductor ends and the electrical fixtures to be wired, as opposed to modular plug-and-cable arrangements or conduit installations in which couplings attach ends of each conduit length to junction boxes, and require the endwise fishing of the conductors through the conduit.

The invention is intended to permit conductors to be placed laterally into a channel or trough installed in a gap between a panel body 22 and a channel 62 defining the lowermost edge of the partition panel, while enclosing the conductors all along their length. This is accomplished by providing a weldment 30 in the base of each partition panel, with an upwardly opening channel defining the cable trough. When the system is fully assembled by attachment of cover panels over the channel, it provides an enclosure along the cable path. An additional bridging trough and cover are provided to extend the enclosure across gaps between adjacent partition panels. In this manner the partitions are readily wired and the finished unit satisfies industry standards (e.g., Underwriters Laboratory requirements) for protecting wiring in a conduit-like enclosure.

Figure 1:
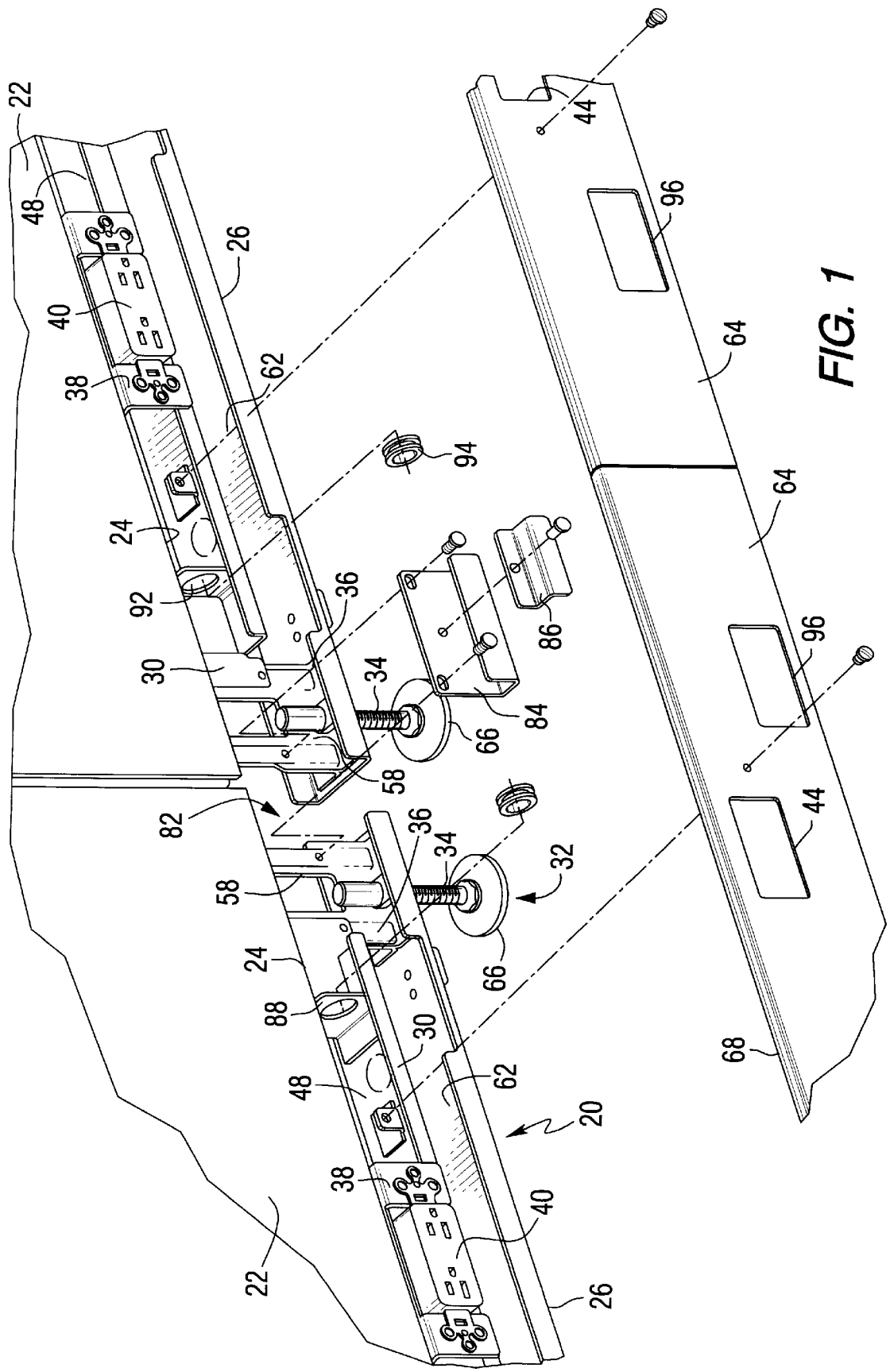
FIG. 1 is a partial perspective view showing the partition panel system of the invention, partly in exploded or disassembled condition.

As shown in FIG. 1, at least two adjacent partition panels are provided. Each has a body or panel 22 to be mounted upright with its lower edge on a base 26. Supporting structures are disposed in base 26, which also defines a wiring path (although the wiring is not shown in FIG. 1 for clarity). An elongated weldment 30 is provided in base 26 and is substantially coextensive with the lower edge 24 of panel body 22. Weldment 30 attaches to support legs 32 in the base, of which there are at least two, for example at the corners of the panel. The support legs include members rigidly connected to and extending between panel body 22 and a lowermost edge channel 62 that is spaced below body 22. In the embodiment shown, threaded levelling bolts 34 with feet, couple for structural support to a bracket and flange fixture 36 providing vertical support. The integral brackets and flanges attach panel base 26 to panel body 22.

Weldment 30 is attached between the bracket and flange fixtures 36, for example by welding or by bolts, rivets or the like, and is disposed in base 26 so as to be spaced below panel body 22 and above lowermost edge channel 62. Weldment 30 comprises an elongated channel carrying one or more formed steel boxes 38 for mounting electrical duplex outlets 40 at outlet positions 42 corresponding with openings in the cover panels. Preferably, two outlet positions 42 are provided on each opposite side of panels 22. However, outlets usually are needed only facing inwardly into a work area, and therefore one or both outlet positions on only one side are normally used. Likewise, no outlets may be needed in certain panels, whereas adjacent panels may have outlets such that through wiring is needed. To accommodate variations, removable plugs or knock-out openings 44 can be provided in the outer cover plates to provide access to outlet positions that are needed, leaving others closed.

Weldment 30 forms a channel 48 opening upwardly and forms a trough in which wires can be laid in laterally of the panels, e.g., separate insulated conductors or multiconductor cables. In the embodiment shown, frame elements 58 of each structural leg are welded or similarly attached to channel 48 to connect the channel relative to body 22 of the panel adjacent to the opposite ends or edges of body 22. These frame elements thus space channel 48 from the lower edge 24 of the body, which leaves a gap above channel 48 to provide lateral access to the channel for laying in wiring. The trough forming channel 48 is placed slightly above the lower-edge structural channel 62 that extends continuously along the bottom edge. The lower channel 62 can be used to hold signal lines such as telephone lines, data communication lines and the like. Whereas the trough forming channel 48 is raised above the lower structural channel 62, the weldment keeps the power lines and signal lines apart, avoiding the induction of currents in the signal lines in the event of a surge of current in the power lines.

Figure 2:
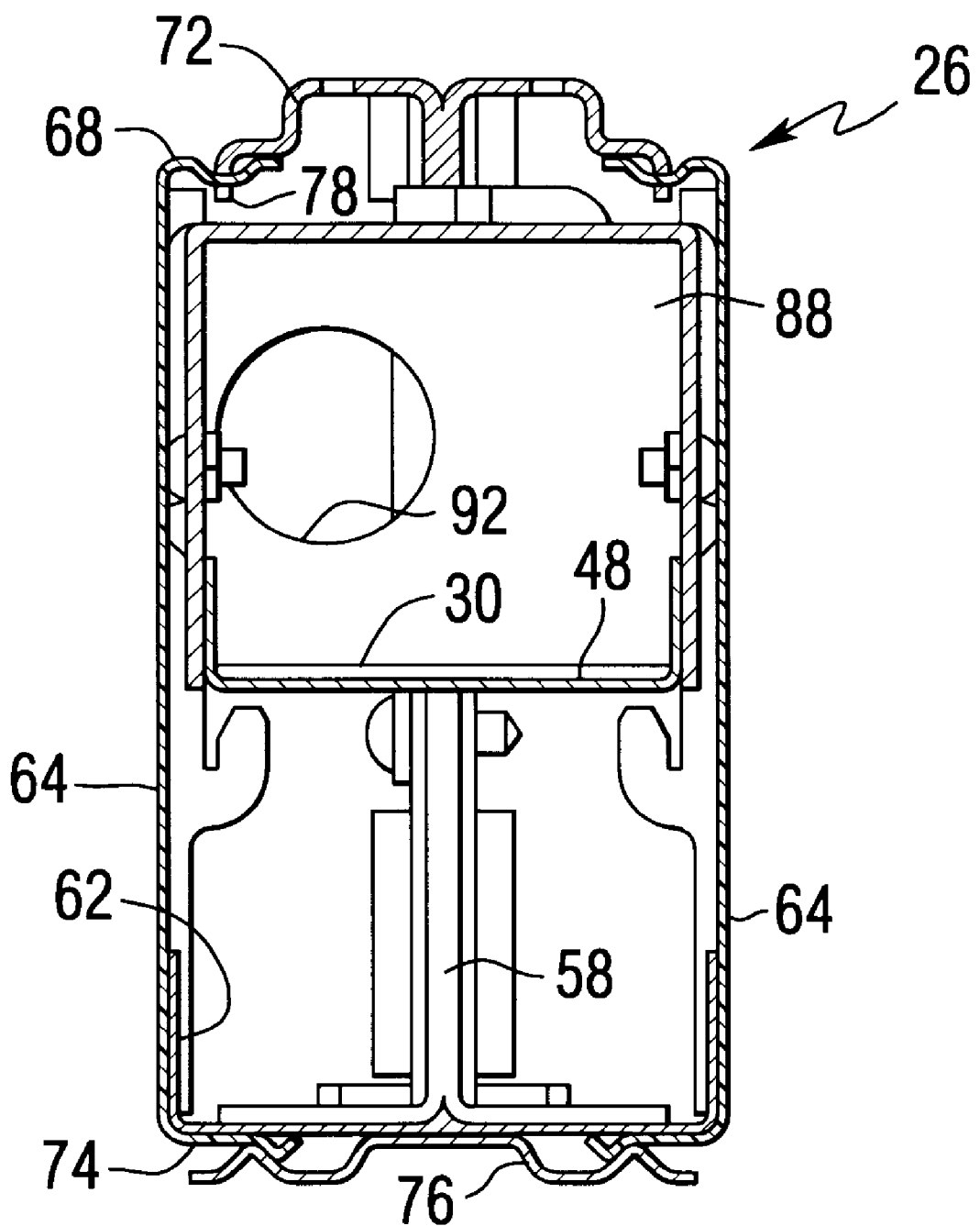
FIG. 2 is a section view through the base of a partition as in FIG. 1, as assembled.
Figure 3:
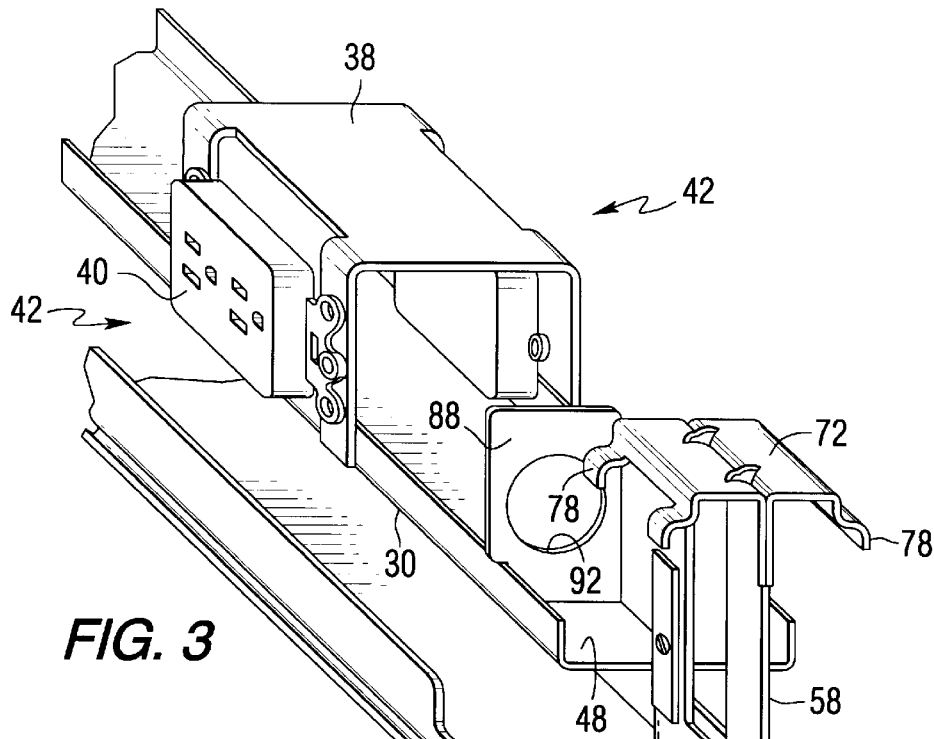
FIG. 3 is a perspective view illustrating the details of a channel weldment according to the invention, in the area of an end containing an electrical outlet.

FIG. 2 is a longitudinal sectional view showing weldment 30, including trough or channel 48, with attached cover plates 64. FIG. 3 is a partial perspective view showing the attachment of weldment 30 to a member 58 of one of the legs. As shown in FIG. 2, cover plates 64 comprise upper flanges 68 that bear upwardly against laterally extending flanges 72 on frame elements 58 at the leg. Cover plates 64 also have lower flanges 74 that snap under a spring element 76 attached on the bottom of the lower structural channel 62. The perspective view of FIG. 3 shows that the engagement of the cover plate flanges and the frame element flanges can include hooked tabs 78 in one that are inserted into complementary openings in the other. The interengaging flanges and the spring element are such that the cover plates snap on securely, but are removable if needed for maintenance or to install additional outlets. Additional connectors such as screws (see FIG. 1) can be provided to lock the cover plates securely in place when mounted.

Figure 4:
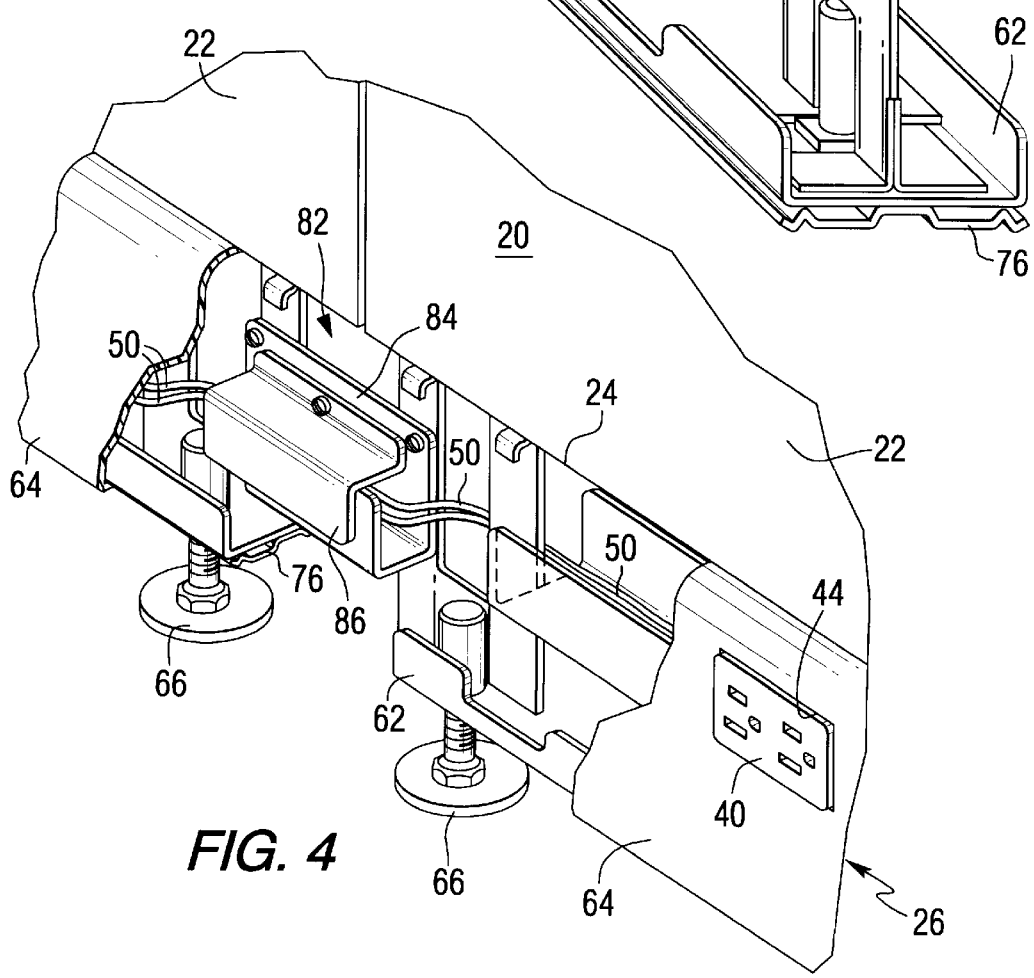
FIG. 4 is a perspective illustration showing use of the bridging element to provide a form of enclosure for wires passing a gap between the partition panels.

The electrical fixtures, namely duplex outlets 40, are mounted by screws, rivets or the like in mountings disposed along the weldment channel at positions corresponding to openings (or knock-outs) in outer covers 64. The mountings comprises boxes welded to upper channel 48, having openings in the sides for the outlet and openings and each end, through which wiring connects to the respective outlet. Referring also to FIG. 4, electrical wiring 50 terminating at the electrical fixtures leads from one panel to a next adjacent panel. The outer covers 64 that are removably mountable on the lower edge at least partly cover channel 48 laterally to enclose the channel and the electrical wiring 50 therein. However, the lower structural channels 62 do not extend fully to the edges of the panel, and cover plates or strips 64 terminate at the edges of their corresponding panels. As a result, there is a gap 82 between the weldments at the bases of the two adjacent partitions.

According to an aspect of the invention, a bridge channel element 84 is provided to extend the cabling channel or trough 48 across gap 82 between the adjacent panels. In the embodiment shown, bridge channel element 84 is attached by screws or rivets to the frame elements 58 that affix weldment 30 to body 22 of the panel. The electrical wiring 50 can be laid in laterally and placed in the channel trough. Wiring 50 is electrically terminated in a conventional manner at the duplex outlet 40 or other electrical fixture, for hardwiring the electrical functions of the partition system. The wiring likewise can be laid laterally into the bridge channel element 84 for routing through to the next panel.

Weldment 30 and its channel 48 support the wiring along the length of the panel, and outer cover strips 64 provide a sealed enclosure. A bridging cover strip 86 closes bridge channel element 84 across the gap 82 between panels, which otherwise would not be fully enclosed because the outer cover strips 64 terminate at the edge of their respective panels. In this manner, the path of wiring 50 is continuously covered along its length and across gap 82, occupying a path spaced upwardly from the lowermost structural channel 62.

As discussed above, the invention is particularly adapted for hardwiring as opposed to modular elements, and does not require the custom installation of conduits between electrical fixtures because the channel and cover structures meet the function of enclosing the path of the wiring. To further facilitate wiring and to further enhance safety by isolating the wiring, at least one barrier element 88 is provided in the channel trough adjacent to the mounting for the electrical fixture 40. Barrier element 88 extends transversely across channel 48 and has an opening 92 through which the electrical conductors 50 are passed, thereby supporting the electrical conductors near their point of attachment to the electrical fixture as well as providing a stop in channel 48 against fire or arcing associated with the electrical fixture. Barrier element 88 preferably receives a flexible grommet 94 in opening 92, for restraining and resiliently protecting the electrical conductors, and better sealing the opening around the conductors. The opening 92 also can be dimensioned for receiving a standard conduit end coupling, for alternative use with conduits.

As shown in FIG. 1, the cover plates have upper openings that align with the electrical outlets, and also lower openings 96. The lower openings can be used to route signal lines into the base of a panel, or a lower opening in one or more of the panels can be used as a point at which connection is made between the electrical power service and a plurality of partition panels on a circuit.

The weldment channels, formed boxes and frame elements can be made of a suitably durable sheet metal such as 12–20 gauge steel. Although the respective channel, frame and box elements are shown and described as being attached by welding, it will be appreciated that it also is possible to rivet, bolt or otherwise attach together the respective parts to provide a structurally integral unit.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A wiring support for a system of adjacent partition panels, each panel having a body to be mounted upright on a lower edge, the wiring support comprising:

an elongated weldment attached to and substantially coextensive with the lower edge of each panel, the weldment forming a channel opening upwardly;

at least two frame elements coupled to the weldment, the frame elements engaging between the body and the weldment adjacent opposite edges of the body, the frame elements spacing the channel from the lower edge of the panel to provide lateral access to the channel;

an electrical fixture disposed in a mounting disposed along the channel, such that the channel supports electrical wiring terminating at the electrical fixture and leads from one panel to an adjacent panel;

an upwardly opening bridge channel element mounted to one of said frame elements and extending the channel across a gap between the adjacent panels;

a cover strip removably mounted at the lower edge of each panel and at least partly covering the channel laterally, the channel being closed by the cover strip, wherein said cover strip encloses the electrical wiring; and a bridging cover strip attached to bridge channel element, covering the bridge channel element across the gap to and creating a continuously enclosed path for the electrical wiring between the adjacent panels;

whereby the electrical wiring can be installed laterally into the channel, and terminated at the electrical fixture, for hardwiring the system of adjacent partition panels.

2. The wiring support of claim 1, wherein a base of the panel comprises a lower channel, the weldment forming an upper channel spaced above the lower channel, and wherein the mounting for the electrical fixture is disposed along the upper channel.

3. The wiring support of claim 2, further comprising length adjustable feet coupled to at least one of the lower channel and the frame elements.

4. The wiring support of claim 1, further comprising at least one barrier element disposed adjacent to the mounting for the electrical fixture and defining an opening through which the electrical wiring is passed, the barrier element supporting the electrical wiring.

5. The wiring support of claim 4, further comprising a flexible grommet disposed in the opening of the barrier element for resiliently protecting the electrical wiring.

6. The wiring support of claim 4, wherein the opening is dimensioned to receive a conduit end coupling.

7. A partition panel system, comprising:

at least two adjacent panels, each having a body to be mounted upright on a lower edge;

an elongated weldment attached to end substantially coextensive with the lower edge of each panel, the weldment forming a channel opening upwardly;

a frame element coupled to the weldment, the frame element engaging between the body and the weldment adjacent an edge of the body, the frame element spacing the channel from the lower edge of the panel to provide lateral access to the channel;

an electrical fixture disposed in a mounting disposed along the channel, such that the channel supports electrical wiring terminating at the electrical fixture and leads from one panel to an adjacent panel;

an upwardly opening bridge channel element mounted to the frame element, the bridge channel element extending the channel across a gap between the adjacent panels;

a cover strip removably mounted at the lower edge of each panel and at least partly covering the channel laterally, the channel being closed by the cover strip, wherein said cover strip encloses the electrical wiring; and a bridging cover strip attached to the bridge channel element, covering the bridge channel element across the gap, to creating a continuously enclosed path for the electrical wiring between the adjacent panels;

whereby the electrical wiring can be installed laterally into the channel, and terminated at the electrical fixture for hardwiring the electrical fixture.

8. The partition panel system of claim 7, further comprising a lower channel, and wherein the weldment forms an upper channel spaced above the lower channel, the mounting for the electrical fixture being disposed along the upper channel.

9. The partition panel system of claim 8, further comprising length adjustable feet coupled to at least one of the lower channel and the frame element.

10. The partition panel system of claim 7, further comprising at least one barrier element disposed adjacent to the mounting for the electrical fixture and defining an opening through which the electrical wiring is passed, the barrier element supporting the electrical wiring.

11. The partition panel system of claim 10, further comprising a flexible grommet disposed in the opening of the barrier element for resiliently protecting the electrical wiring.

12. The partition panel system of claim 10, wherein the opening is dimensioned to receive a conduit end coupling.

* * * * *

UNITED STATES PATENT AND TRADEMARK OFFICE
CERTIFICATE OF CORRECTION

PATENT NO. : 5,901,512
DATED : May 11, 1999
INVENTOR(S) : WALLACE C. BULLWINKLE

It is certified that error appears in the above-indentified patent and that said Letters Patent is hereby corrected as shown below:

Column 7, claim 7, line 23, delete ---to---.

Signed and Sealed this

Thirty-first Day of August, 1999

Attest:

Q. TODD DICKINSON

*Attesting Officer*      *Acting Commissioner of Patents and Trademarks*